United States Patent [19]

Boffo

[11] Patent Number: 5,094,069
[45] Date of Patent: Mar. 10, 1992

[54] GAS TURBINE ENGINE HAVING A MIXED FLOW COMPRESSOR

[75] Inventor: Marc Boffo, Stansstadt, Switzerland

[73] Assignee: MTU Motoren und Turbinen Union Muenchen GmbH, Fed. Rep. of Germany

[21] Appl. No.: 535,529

[22] Filed: Jun. 11, 1990

[30] Foreign Application Priority Data

Jun. 10, 1989 [DE] Fed. Rep. of Germany ....... 3919097

[51] Int. Cl.$^5$ ................................................. F02C 3/14
[52] U.S. Cl. ..................................... 60/39.36; 60/751; 60/760
[58] Field of Search ........................ 60/39.36, 760, 751, 60/39.75, 269; 415/208.1, 199.1, 199.2, 199.3

[56] References Cited

U.S. PATENT DOCUMENTS 2,640,319  6/1953  Wislicenus ............................. 60/751
3,365,892  1/1968  Derderian ............................. 60/39.36
3,404,853  10/1968  Miller ................................. 60/39.75

FOREIGN PATENT DOCUMENTS 1002314  3/1952  France ................................. 60/39.36

Primary Examiner—Richard A. Bertsch
Assistant Examiner—Timothy S. Thorpe
Attorney, Agent, or Firm—Evenson, Wands, Edwards, Lenahan & McKeown

[57] ABSTRACT

A gas turbine engine is disclosed having a mixed-flow compressor and a connecting mixed-flow diffuser. The mixed-flow diffuser is disposed inside the annularly arranged combustion chambers and supplying them, from the direction of the radial interior side, in the reverse flow, with compressor air. Gas turbine engines of this type are more compact and show a higher efficiency than turbine engines having radial flow compressors.

13 Claims, 1 Drawing Sheet

GAS TURBINE ENGINE HAVING A MIXED FLOW COMPRESSOR

BACKGROUND AND SUMMARY OF THE INVENTION

The invention relates to a gas turbine engine having a mixed-flow compressor and a connecting mixed-flow diffuser.

Gas turbine engines with a known arrangement of the mixed-flow compressor and the mixed-flow diffuser arranged behind it have the disadvantage of a larger overall length in comparison to gas turbine engines with a radial-flow compressor and a radial-flow diffuser arranged behind it.

It is another disadvantage of the known arrangement of mixed-flow compressors in gas turbine engines that the combustion chambers are acted upon by compressor air according to the uniflow method so that compressor air which is disadvantageously heated by the outer wall of the flame tube is admixed to the hot gas flow as temperature-reducing tertiary air in the outlet area of the flame tubes.

It is an object of the invention to provide a gas turbine engine of the above-mentioned type which, while the compressor output which can be reached by means of a radial-flow compressor is unchanged, has a smaller outside radius while the overall length is reduced or is at least equal.

This object is achieved in that the mixed-flow diffuser is arranged inside an annular combustion chamber or an annulus formed of several annularly arranged individual combustion chambers.

It is an advantage of the solution according to the invention that the overall length of the mixed-flow diffuser does not extend the total length of the gas turbine engine because it is arranged radially inside the combustion chamber. As a result, the gas turbine engine becomes more compact and smaller in its radius than a gas turbine engine with the same compressor output having a radial-flow compressor, a radial-flow diffuser connected behind it and an elbow for deflecting the flow into the horizontal level. Furthermore, the rotor of the mixed-flow compressor was optimized with respect to the rotor rings, the rotor diameter and the deceleration conditions. Rotor blades which were considerably bent in front were found to be particularly advantageous for having a strong deceleration effect in this area.

A preferred development of the invention is achieved in that the mixed-flow diffuser is arranged in a common annular housing with an annular combustion chamber or with annularly arranged individual combustion chambers. This advantageously improves the compactness of the gas turbine engine. At the same time, the inside and outside radius of the mixed-flow diffuser can be reduced from the annular inlet opening to the annular outlet opening without impairing the operation of the diffuser. This advantage cannot be achieved by means of a radial-flow compressor with a radial-flow diffuser connected behind it.

A deflecting chamber and a deflecting wall are preferably provided for deflecting the compressor air from the outlet of the mixed-flow diffuser to the combustion chambers arranged radially on the outside. In the deflecting chamber, the compressed air is advantageously swirled and is supplied to the combustion chamber along the shortest path on the deflecting wall.

By means of the preferred arrangement of the deflecting wall in the outlet area of the combustion chambers, the combustion chambers or the annular combustion chambers are acted upon by compressor air in the reverse flow. As a result, unheated compressor air, as temperature-lowering tertiary air, is advantageously admixed to the hot gas flow in the outlet area of the flame tubes.

The compressor output can preferably be increased in that a multi-stage axial-flow compressor is connected in front of the mixed-flow compressor. This arrangement has the advantage that the deflecting chamber and the deflecting wall are supplied with an increased compressor air pressure.

A part of the deflecting wall may be formed by a part of a turbine disk, preferably by the radially outside area of the turbine disk of the first turbine stage. As a result, material and weight may advantageously be saved, and the turbine disk is cooled at the same time.

A preferred construction of the deflecting wall provides a circumferential seal between the interior wall of the deflecting chamber and the turbine disk of the first turbine stage, the circumferential seal being arranged at the interior edge of the deflecting wall formed by the turbine disk. As a result of this construction of the interior wall of the deflecting chamber and of the circumferential seal at the interior edge of the turbine disk, the whole deflecting wall is advantageously formed by one part of the turbine disk. It is another advantage of this arrangement that a portion of the compressor air can be supplied to additional consuming devices without additional connecting elements, such as co-rotating cover disks on the turbine disk. In a preferred development of the invention, openings are therefore provided in the edge area of the turbine disk which supply cooling ducts of turbine blades located in the edge area of the turbine disk with a portion of the compressor air which is available at the outlet of the mixed-flow diffuser.

Additional advantages can be achieved by means of the invention in that a bearing chamber of a turbine shaft is preferably arranged radially inside the mixed-flow diffuser. By means of this arrangement, the bearing chamber is protected from the heat of the combustion chambers which are arranged radially on the outside.

Other objects, advantages and novel features of the present invention will become apparent from the following detailed description of the invention when considered in conjunction with the accompanying drawings.

DETAILED DESCRIPTION OF THE DRAWINGS

Figure 1:
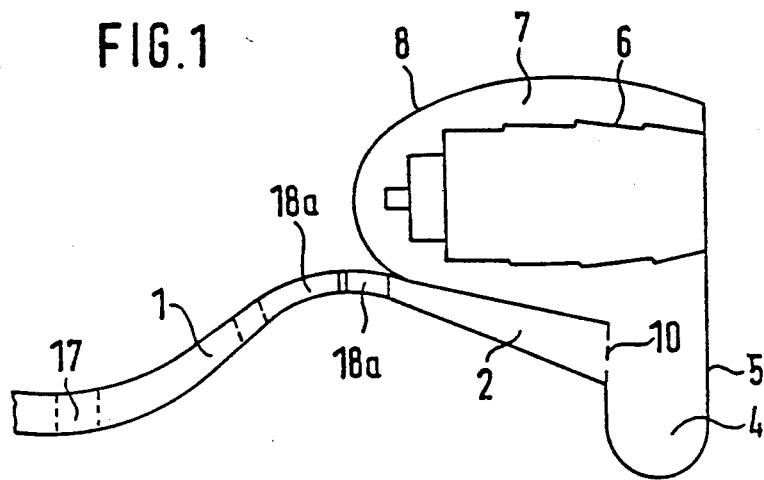
FIG. 1 is a schematic sectional view of a compressor end stage as the mixed-flow compressor with a combustion chamber arrangement, constructed according to a preferred embodiment of the invention.

FIG. 1 shows a compressor end stage as the mixed-flow compressor 1 which is connected to an eight-stage axial-flow compressor of which the eighth guide baffle 17 is outlined in dash lines. The flow, which flows out of the mixed-flow compressor 1 at 25° to 29°, is deflected in a baffle guide 18a and 18b which is divided into two parts and swivels into a horizontal level, with 40 blades in the first baffle guide 18a and 80 blades in the second baffle guide 18b. Subsequently, the flow is decelerated from approximately 0.35 Ma to 0.15 Ma in mixed-flow diffuser 2, which in the example shown does not have any blades and the outside and inside diameters of which may decrease as shown in the direction of the deflecting chamber 4. The compressor air, by way of a deflecting wall 5, is then supplied to the combustion chamber 6 which is arranged in an annulus 7 and forms an annular housing 8 together with the mixed-flow diffuser 2.

This arrangement does not only have a higher efficiency than the previously known compressor end stages in the radial-flow construction, but has the additional advantage of a shorter overall length and height because a considerable portion of the mixed-flow compressor end stage can be pushed under the combustion chamber 6.

Figure 2:
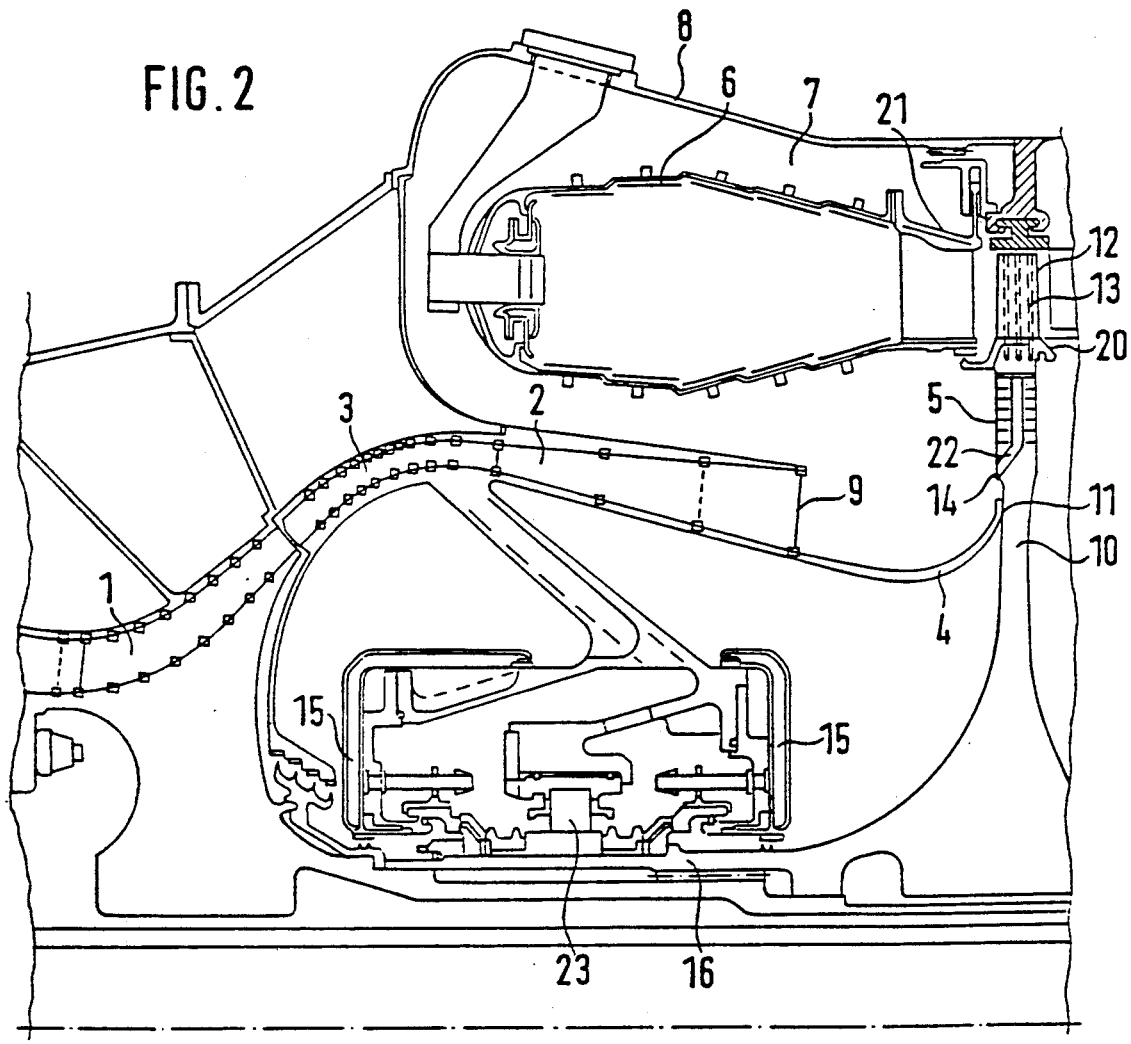
FIG. 2 is a view of a compressor end stage as the mixed-flow compressor with the combustion chamber and the first turbine stage, constructed according to a preferred embodiment of the invention.

FIG. 2 is a view of a compressor end stage as a mixed-flow compressor 1 having a combustion chamber 6 and a first turbine stage 20. In this case, a part of the turbine disk 10 forms the deflecting wall 5 for the deflection of the flow in the direction to an outlet area 21 of the combustion chamber 6. In this outlet area 21, the temperature of the hot-gas flow in the combustion chamber is cooled by the admixing of the tertiary air branched off from the compressor air, before the air/hot-gas mixture starts driving the turbine shaft 16 by means of the turbine blades 12 and the turbine disk 10. By way of the cooling ducts 13 and the opening 14 in the area of the turbine disk 10 which at the same time is used as the deflecting wall 5, the turbine blades 12 are supplied with cooling air which therefore is branched off directly from the compressor air from the mixed-flow diffuser 2. For this purpose, the opening 14 may be constructed as an annular groove 22 having blades or ribs.

As shown in FIG. 2, a bearing chamber 15 of a bearing 23 of the turbine is arranged in such a manner that the bearing chamber 16 is disposed inside the annular mixed-flow diffuser 2 which has no blades so that the mixed-flow diffuser 2, at the same time, carries out the function of a heat barrier between the combustion chamber 6 and the bearing chamber 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas turbine engine, comprising:
   a multi-flow axial stage compressor having an end stage;
   a mixed-flow diffuser having an outlet;
   a mixed-flow compressor forming said end stage, said mixed-flow compressor arranged diagonally within the engine to connect with said mixed-flow diffuser;
   an annular combustion chamber means;
   wherein the mixed-flow diffuser is arranged radially inside said annular combustion chamber means;
   air cooled turbine blades having cooling ducts;
   a turbine disk having an edge area, said turbine disk forming a deflecting wall; and
   wherein said air cooled turbine blades being fastened in the edge area of said turbine disk, said cooling ducts being connected directly with the outlet of said mixed-flow diffuser via openings in the deflecting wall formed by the turbine disk.

2. A gas turbine engine according to claim 1, wherein the annular combustion chamber means and the mixed-flow diffuser are arranged in a common annular housing.

3. A gas turbine engine according to claim 2, wherein a deflecting chamber and the deflecting wall are arranged in the area of the outlet of the mixed-flow diffuser.

4. A gas turbine engine according to claim 1, wherein a deflecting chamber and the deflecting wall are arranged in the area of the outlet of the mixed-flow diffuser.

5. A gas turbine engine according to claim 4, wherein the deflecting chamber and the deflecting wall are arranged in such a manner that the annular combustion chamber means are acted upon by compressor air in the reverse flow.

6. A gas turbine engine according to claim 5, wherein the deflecting wall is formed by the radially exterior area of a turbine disk of a first turbine stage.

7. A gas turbine engine according to claim 6, wherein a circumferential seal is provided between the interior wall of the deflecting chamber and the turbine disk of the first turbine stage, this circumferential seal being arranged at the interior edge of the deflecting wall formed by the turbine disk.

8. A gas turbine engine according to claim 7, wherein a bearing chamber of a turbine shaft is arranged radially inside the mixed-flow diffuser.

9. A gas turbine engine according to claim 4, wherein the deflecting wall is formed by the radially exterior area of a turbine disk of a first turbine stage.

10. A gas turbine engine according to claim 9, wherein a circumferential seal is provided between the interior wall of the deflecting chamber and the turbine disk of the first turbine stage, this circumferential seal being arranged at the interior edge of the deflecting wall formed by the turbine disk.

11. A gas turbine engine according to claim 1, wherein a bearing chamber of a turbine shaft is arranged radially inside the mixed-flow diffuser.

12. A gas turbine engine according to claim 1, wherein the annular combustion chamber means is a single annular combustion chamber.

13. A gas turbine engine according to claim 1, wherein the annular combustion chamber means includes a plurality of separate combustion chambers arranged in an annular space surrounding the mixed-flow diffuser.

* * * * *